(No Model.)

C. E. STONE.
GARMENT SUPPORTER.

No. 568,812. Patented Oct. 6, 1896.

WITNESSES:
S. M. Holden
C. Gast

INVENTOR
Charles E. Stone.
BY
Edgar Tate & Co
ATTORNEYS.

UNITED STATES PATENT OFFICE.

CHARLES EDWIN STONE, OF AMESBURY, MASSACHUSETTS, ASSIGNOR OF ONE-HALF TO BENJAMIN F. SARGENT, OF SAME PLACE.

GARMENT-SUPPORTER.

SPECIFICATION forming part of Letters Patent No. 568,812, dated October 6, 1896.

Application filed January 13, 1896. Serial No. 575,211. (No model.)

*To all whom it may concern:*

Be it known that I, CHARLES EDWIN STONE, a citizen of the United States, and a resident of Amesbury, in the county of Essex and State of Massachusetts, have invented certain new and useful Improvements in Supports for Stockings and other Articles, of which the following is a specification, reference being had to the accompanying drawings, forming a part thereof, in which similar letters of reference indicate corresponding parts.

This invention relates to clamps or supporting devices for stockings or other articles, and the object thereof is to provide an effective device of this class which is simple in construction and operation, and which may be readily connected with the upper part of a stocking and an undergarment, and which may also be used in any other relation and to support articles of various kinds and classes; and with this and other objects in view the invention consists in the device constructed as hereinafter described and claimed.

The invention is fully disclosed in the following specification, of which the accompanying drawings form a part, in which—

Figure 1:
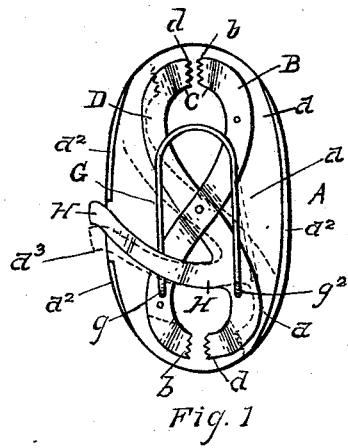
Figure 2:
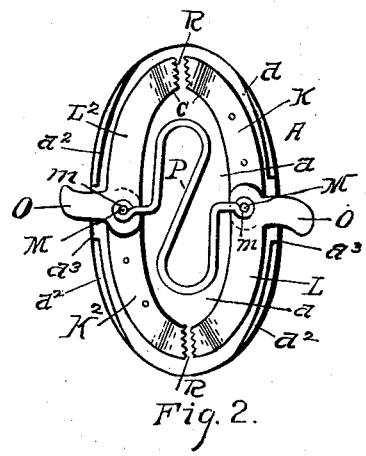
Figure 3:
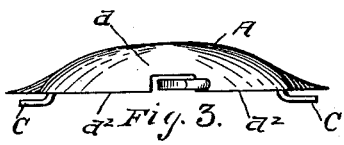

Figure 1 is a plan view of my improvement, one side of the casing thereof being removed; Fig. 2, a similar view of a modified form thereof, and Fig. 3 a side view.

In the practice of my invention I provide an oblong back or casing A, which is preferably elliptical and shell-like in form, being convex on one side and concave on the other, and the shell or casing proper, which is designated by $a$, is provided at each side with flanges or rims $a^2$, within which the operative devices are placed. This device may be of any desired size, and rigidly secured within the casing or shell and longitudinally thereof is an S-shaped member B of the clamp, the ends of which project in opposite directions and are provided with serrations or teeth $b$, and pivotally connected with the member B, at the center of the casing, is a similar movable member D of the clamp, the ends of which are also turned in opposite directions and in the direction of the ends of the member B and are also provided with serrations or teeth $d$.

Secured within the casing, in the manner shown in Fig. 1, is a yoke-spring G, one end of which is rigidly secured to the member B at $g$ and the other end to the member D at $g^2$, and said member D is provided with a curved projecting arm or lever H, which extends over the adjacent portion of the member B, over the arm of the yoke G, which is secured thereto, and out through a slot or opening $a^3$ in one of the side flanges or rims of the shell or casing.

The ends or jaws of the members B and D are upset or bent outwardly from the shell or casing, as shown at C, and the operation of this device will be readily understood from the foregoing description when taken in connection with the accompanying drawings.

In order to separate the corresponding ends of the members B and D, it is only necessary to depress the outer end of the lever H, as shown in dotted lines, when the clamp D will be turned on its pivotal connection, and the jaws or ends thereof will be separated from the jaws or ends of the member B, and when in this position the upper portion of a stocking may be inserted between said jaw or ends at one end of the device, and the other end may be similarly connected with a pair of drawers or other undergarment, and then by releasing the arm or lever H the spring G will at once throw the ends or jaws of the members together and securely hold them in such position, and in Fig. 2 I have shown a modified form of construction in which four separate members are employed, each of which is curved or segmental in form, and the four taken together constitute an ellipse. In this construction I provide a member K of the clamp, which is rigidly secured in place, and a similar member $K^2$ of the clamp is secured at the opposite side and opposite end of the casing, and two similar members L and $L^2$ of the clamp are also employed, which are pivotally connected with the casing or with the inner ends of the members K and $K^2$ of the clamp, as shown at M, and this pivotal connection is made by pins $m$, which are rigidly secured to or formed on the pivoted members L and L² of the clamp, and each of said pivoted clamps is provided with a projecting arm or lever O, which extends outwardly through the slots $a^3$ in the side flanges $a^2$ of the casing or shell, and secured to the pivot-pins $m$ is an S-shaped spring P, which is designed to hold the outer ends of the pivoted members L and L² of the clamp in contact with the outer ends of the members K and K² of the clamp, which are rigidly secured in position. The operation of this form of construction will also be readily understood, and is similar to that of the construction shown in Fig. 1.

The ends of the members L and L² and K and K² of the clamps are each provided with serrations or teeth, as shown at R, and in operating this device it is only necessary to press in opposite directions upon the arms or levers O, and by this operation the ends of the pivoted members L and L² of the clamp will be separated from the ends of the members K and K² of the clamp, when the device may be connected with the article which is to be supported at one end and with the article which is to constitute the support at the other end, and then by releasing said arms or levers O the pivoted members L and L² of the clamp will be thrown into engagement with the members K and K² of the clamp, and thus the device will be caused to securely grasp the article to be supported and also the article which constitutes the support, this operation being effected by the spring P.

It will thus be seen that I provide an effective device of this class, and one which is simple in construction and which is perfectly adapted to produce the result for which it is intended, and if desired the side flanges $a^2$ may be enlarged and bent over so as to inclose the operative mechanism.

My invention is not limited to the exact form, construction, combination, and arrangement of parts herein shown and described; and it is evident that changes therein and modifications thereof may be made without departing from the spirit of my invention or sacrificing its advantages.

In practice I prefer to form the casing or shell of a single piece, and the side flanges or rims may be folded over to form a front and thus inclose the operative mechanism, but this feature is immaterial, and said casing may be formed in any desired manner.

Having fully described my invention, I claim as new and desire to secure by Letters Patent—

1. The herein-described support which consists of a casing or shell within which is rigidly secured a longitudinal member, the ends of which are bent in opposite directions, and in which is also placed, a pivoted member of similar form, which is also arranged longitudinally of the casing or shell, and the ends or jaws of which are bent in the direction of those of the rigid member, and means for operating said pivoted clamp so as to throw the ends or jaws thereof in contact with those of the rigid member, substantially as shown and described.

2. The herein-described support which consists of a casing or shell within which is rigidly secured a longitudinal member, the ends of which are bent in opposite directions, and in which is also placed, a pivoted member of similar form, which is also arranged longitudinally of the casing or shell, and the ends or jaws of which are bent in the direction of those of the rigid member, and means for operating said pivoted clamp so as to throw the ends or jaws thereof, in contact with those of the rigid member, consisting of a spring, and an arm or lever connected with said pivoted member and extended through one side of the shell or casing, substantially as shown and described.

3. The herein-described support which consists of a casing or shell within which is rigidly secured a longitudinal member, the ends of which are bent in opposite directions, and in which is also placed, a pivoted member of similar form, which is also arranged longitudinally of the casing or shell, and the ends or jaws of which are bent in the direction of those of the rigid member, and means for operating said pivoted member so as to throw the ends or jaws thereof, in connection with those of the rigid member, consisting of a spring, and an arm or lever connected with said pivoted member and extended through one side of the shell or casing, and the ends or jaws of each of the members being upset or set out from the shell or casing, substantially as shown and described.

4. The herein-described support which consists of a casing or shell provided with side flanges or rims, and members which are located therein, and extend longitudinally thereof, part of said members being pivoted and part being rigidly secured to the shell or casing, and the outer ends of said members at each end of the shell or casing being upset or set out therefrom, and the ends or jaws of each being also provided with serrations or teeth, and means for operating the pivoted members so as to throw the ends or jaws thereof, in contact with the rigid members, substantially as shown and described.

5. The herein-described support which consists of a casing or shell provided with side flanges or rims and members which are located therein, and extend longitudinally thereof, part of said members being pivoted and part being rigidly secured to the shell or casing, and the outer ends of said members at each end of the shell or casing being upset or set out therefrom, and the ends or jaws of each being also provided with serrations or teeth, and means for operating the pivoted members so as to throw the ends or jaws thereof, in contact with the rigid members, consisting of springs which are connected therewith, and arms or levers which are also connected therewith or formed thereon, and which extend through the side of the casing or shell, substantially as shown and described.

In testimony that I claim the foregoing as my invention I have signed my name, in presence of the subscribing witnesses, this 3d day of January, 1896.

CHARLES EDWIN STONE.

Witnesses:
JAMES HENNEBERG,
JOHN N. QUIMBY.